United States Patent
Castagna et al.

(10) Patent No.: US 9,304,268 B2
(45) Date of Patent: Apr. 5, 2016

(54) OPTICAL INTERPOSER WITH NINETY DEGREE LIGHT BENDING

(75) Inventors: Lou Castagna, Middletown, PA (US); Richard Dean Miller, Lancaster, PA (US); Shelly Ann Buchter, East Berlin, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 480 days.

(21) Appl. No.: 13/348,960

(22) Filed: Jan. 12, 2012

(65) Prior Publication Data

US 2013/0182994 A1    Jul. 18, 2013

(51) Int. Cl.
   *G02B 6/26*    (2006.01)
   *G02B 6/42*    (2006.01)
(52) U.S. Cl.
   CPC .................... *G02B 6/4214* (2013.01)
(58) Field of Classification Search
   CPC ....................................... G02B 6/364
   See application file for complete search history.

(56) References Cited

U.S. PATENT DOCUMENTS

| 5,600,744 | A * | 2/1997 | Takahashi ................ 385/38 |
| 6,257,772 | B1 * | 7/2001 | Nakanishi et al. ........... 385/89 |
| 7,511,258 | B2 | 3/2009 | Bowen et al. |
| 2004/0202428 | A1 * | 10/2004 | Hwang et al. .............. 385/49 |

OTHER PUBLICATIONS

Bowen, et al., U.S. Appl. No. 13/017,668, filed Jan. 31, 2011, entitled "Optical Interposer for Waveguides".
Hwant, et al., "Parallel Optical Transmitter Module Using Angled Fibers and a V-Grooved Silicon Optical Bench for VCSEL Array", IEEE Transactions on Advanced Packaging, vol. 29, No. 3, Aug. 2006.

* cited by examiner

*Primary Examiner* — Uyen Chau N Le
*Assistant Examiner* — Chad Smith

(57) ABSTRACT

An optical interposer comprising: (a) a crystalline substrate having a top planar surface and a crystalline plane angle; (b) a groove defined in the top planar surface and extending from an edge of the substrate to a terminal end, the groove having side walls and a first facet at the terminal end, the facet having a first angle relative to the top planar surface, the first angle being about the crystalline plane angle, the first angle having a delta from 45°; (c) a reflective coating on the first facet; and (d) an optical conduit having an optical axis and an end face optically coupled with the first facet, the end face having a second angle with respect to the optical axis such that the angle of refraction at the end face compensates for the delta such that the end face and the first facet cooperate to bend light about 90°.

14 Claims, 4 Drawing Sheets

OPTICAL INTERPOSER WITH NINETY DEGREE LIGHT BENDING

FIELD OF INVENTION

The present invention relates generally to optical interfaces, and more particularly, to an interposer with light bending.

BACKGROUND OF INVENTION

The use of optical fibers as a medium for transmission of digital data (including voice, interne and IP video data) is becoming increasingly more common due to the high reliability and large bandwidth available with optical transmission systems. Fundamental to these systems are optical subassemblies for transmitting and/or receiving optical signals.

A common optical subassembly comprises an interposer. As used herein, an interposer functions as a substrate for optical, opto-electrical, and electrical components and provides interconnections to optically and/or electrically interconnect the optical/opto-electrical/electrical components. For example, a typical interposer may comprise a substrate comprising, for example, silicon, having one or more grooves formed therein for holding fibers precisely. A conventional groove is formed in the shape of a "V" by wet etching the substrate to include two sidewalls that retain the optical fiber along its length. Wet etching a crystalline material such as silicon results in a predictable and very precise etch along the crystalline plane of the material. For example, silicon has a crystalline plane of 54.7°, thus, the sidewalls and the end face are typically formed at a precise angle of 54.7° from the reference surface.

The end face of a conventional interposer V-groove is metalized so that it may be used as a mirror to reflect light between the optical/opto-electrical component and the optical fiber. For example, in the case of a transmitter, an opto-electrical light source emits a cone-shaped light beam onto the V-groove end face mirror. The V-groove end face mirror reflects the light through an end of the optical fiber retained in the V-groove. As discussed above, the surface of the V-groove end face is at an angle of precisely 54.7° from the reference surface. As such, light is reflected off the groove end face mirror through the optical fiber at approximately −9.3° from the reference surface and also from the longitudinal axis of the optical fiber retained in the V-groove. Therefore, current devices utilizing the end face mirror of the groove to launch light through an end of the optical fiber cause much of the light to be reflected away from the axis of the optical fiber resulting in non-optimal signal transmission performance.

Applicants recognize that there is a need for an improved optical coupling between the optical device and the optical conduit. Additionally, Applicants recognize that this optical coupling should be achievable through passive alignment rather than active alignment to facilitate economic production of the subassembly. To this end, a patent application (U.S. application Ser. No. 12/510,954, incorporated herein referenced) was filed recently, which discloses a multi-faceted fiber end face mirror for optical coupling. Specifically, the facets of the fiber end face mirror included a 54.7° facet to mechanically contact the end face of the V-groove to precisely position the optical fiber end face mirror in the V-groove along the longitudinal axis and under the emission aperture of the opto-electrical device. Additionally, another facet was a 45° facet to facilitate optimal optical coupling between the optical axis of the fiber and the optical axis of the opto-electrical device. Additional facets were also disclosed for enhancing performance. Each of these facets would then be coated with a metal to act as a reflective mirror surface.

Although this development improved the optical performance and facilitated passive alignment of the subassembly, it also required coating the fiber end face on a number of different facets with a metallic/reflective coating. Applicants have identified an additional need to avoid the requirement for depositing a reflecting coating on fiber end faces as such a process tends to be complicated and expensive, and does not lend itself to a high-volume manufacturing.

Therefore, a need exists for a simplified approach for preparing an optical subassembly having a 90° optical coupling that can be prepared using high-volume, economical manufacturing techniques. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides an interposer that bends light 90° between the optical device and the optical conduit, yet is readily manufactured on the wafer scale using reliable, precise and economical wet etching techniques. Specifically, Applicants recognize that, by shaping the end face of the optical conduit, the angle of refraction at the end face can alter the incident light on the reflective surface to compensate for a reflective surface that is not at a 45° angle to the optical axes of the optical device and the optical conduit. According, the end face may be adjusted to compensate for the crystalline plane angle in the substrate such that wet etching—which is dependent on the crystalline plane angle—may be used. For example, in an embodiment in which the substrate is crystalline silicon and the angle of the reflective surface is 54.7° (which corresponding to the crystalline plane of silicon), the end face of a fiber may be shaped with a 123.1° angle (relative to the optical axis of the optical conduit), which compensates for the reflective surface being 9.7° off of 45° such that the light between the end face and the optical device is bent 90°.

In light of the above, one aspect of the invention is an interposer comprising a configurable reflective surface for optically coupling an optical conduit with an optical device. In one embodiment, the interposer comprises: (a) a crystalline substrate having a top planar surface and a crystalline plane angle; (b) at least one groove defined in the top planar surface and extending from an edge of the substrate to a terminal end, the groove having side walls and a first facet at the terminal end perpendicular to side walls, the facet having a first angle relative to the top planar surface, the first angle being about the crystalline plane angle, the first angle having a delta from 45°; (c) a reflective coating on the first facet; and (d) an optical conduit having an optical axis and an end face optically coupled with the first facet, the end face having a second angle with respect to the optical axis such that the angle of refraction at the end face compensates for the delta such that the combination of the end face and the first facet bends light about 90°.

Another aspect of the invention is a subassembly comprising the interposer integrated with an optical device and an optical conduit. In one embodiment, the subassembly comprises: A subassembly comprising: (a) a crystalline substrate having a top planar surface and a crystalline plane angle; (b) at least one groove defined in the top planar surface and extending from an edge of the substrate to a terminal end, the groove having side walls and a first facet at the terminal end perpendicular to side walls, the facet having a first angle relative to the top planar surface, the first angle being about the crystalline plane angle, the first angle having a delta from a 45° angle; (c) a reflective coating on the first facet; and (d) an optical conduit having an optical axis and an end face optically coupled with the first facet, the end face having a second angle with respect to the optical axis such that the angle of refraction at the end face compensates for the delta such that the combination of the end face and the first facet bends light about 90° and (e) the optical device having an optical axis perpendicular to the top planar surface, the optic device being disposed on the top planar surface at the terminal end such that its optical axis is disposed over the first facet at 90° to the optical axis of the optical conduit.

DETAILED DESCRIPTION

Figure 1:
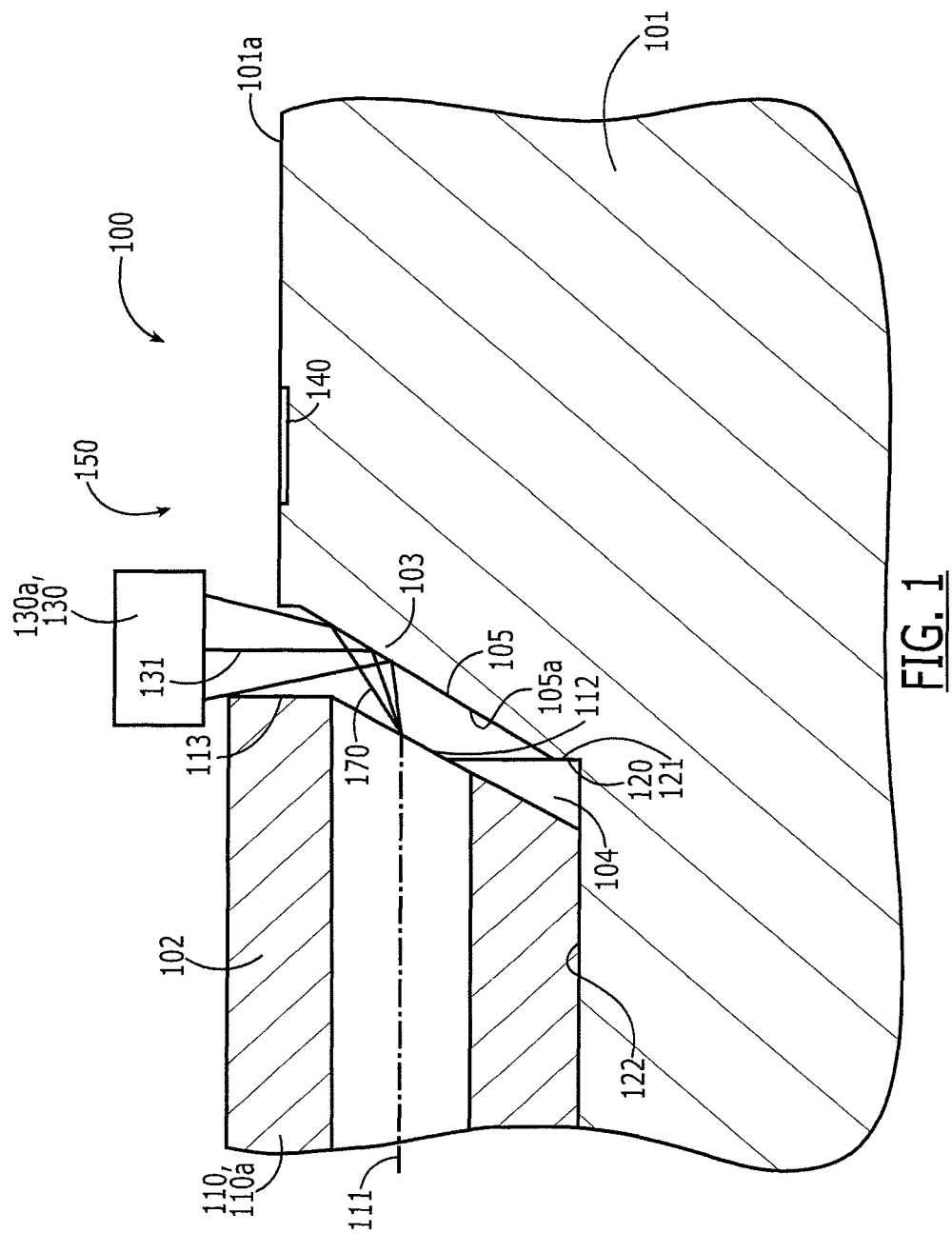
FIG. 1 shows a cross section of a portion of one embodiment of an interposer of the present invention.
Figure 1A:
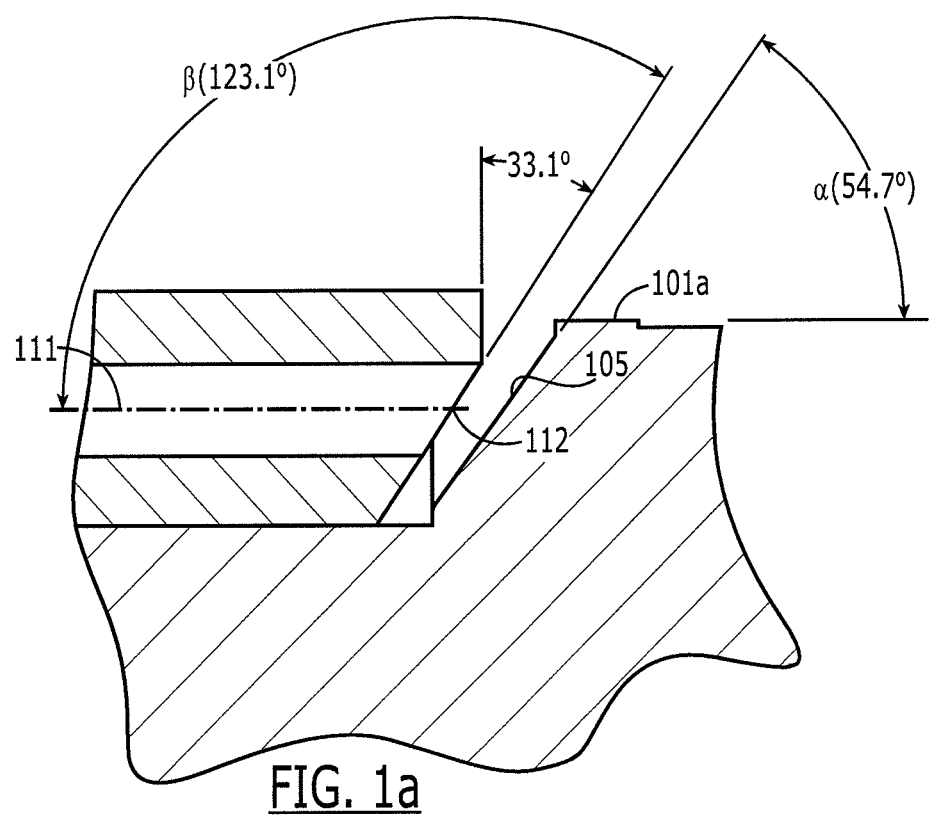
FIG. 1a shows a close up view of the terminal end of the groove of the interposer of FIG. 1.

Referring to FIG. 1, one embodiment of subassembly 100 of the present invention is shown. The subassembly 100 comprises an interposer 150 which comprises a crystalline substrate 101 having a top planar surface 101a and a crystalline plane angle (not shown). At least one groove 102 is defined in the top planar surface 101a. The groove 102 extends from an edge (not shown) of the substrate to a terminal end 103. The groove has side walls 104 and a first facet 105 at the terminal end 103 that is perpendicular to the side walls. The first facet 105 has a first angle α relative to the top planar surface as shown in FIG. 1a. The first angle is about the crystalline plane angle. Because the crystalline plane is not usually 45°, the first angle will have a delta from a 45° angle. The first facet 105 has a reflective coating 105a. The subassembly also comprises an optical device 130 having an optical axis 131 perpendicular to the top planar surface 101a. The optic device 130 is disposed on the top planar surface 101a at the terminal end 103 such that its optical axis 131 is disposed over the first facet 105. The subassembly 100 also comprises an optical conduit 110 having an optical axis 111 and an end face 112 optically coupled with the first facet 105. Referring to FIG. 1a, the end face 112 has a second angle β with respect to the optical axis 111 such that the angle of refraction at the end face compensates for the delta such that the optical coupling of the beam 170 between the optical axes 111, 131 is about 90° as shown in FIG. 1. Each of these elements and alternative embodiments are described in greater detail below.

A primary function of the interposer is to provide a substrate or backbone to support and secure the fiber, optical device(s) and supporting electrical circuitry. To this end, it should comprise a rigid material that can be etched or machined to define the grooves and is thermally stable, suitable for being heated to temperatures typical in solder reflow applications. To facilitate manufacturability, in one embodiment, the substrate comprises a crystalline material having a crystalline plane angle. Such materials are known to wet etch along the crystalline plane angle, resulting in a predicable and highly precise groove. Wet etching can also be performed on wafer scale, thereby defining all the grooves and facets in the substrate in a single simultaneous operation. In one embodiment, even the sides of the individual interposers are defined in this operation. Examples of suitable crystalline materials include elemental materials having a crystalline form, such as silicon, quartz, sapphire, and ruby.

In one embodiment, the parallel side walls 104 of the groove hold the optical conduit in place. (Although single fiber applications are shown and described herein, it should be appreciated that the invention is not limited to single fiber applications and may be applied to arrays of fibers, ribbon fiber, and planar waveguides.) The sidewalls may be the walls of a traditional V-groove, or they may be perpendicular to the top planar surface such that they form more of a U-groove. Wet or dry etching or machining may be used to form grooves, although wet etching is generally preferred (although not necessary) as it facilitates manufacturability as mentioned above.

In one embodiment, the substrate defines multiple grooves. Although not necessary, in this embodiment, the grooves are preferably parallel. Among other benefits, parallel grooves facilitate a common first facet (described below).

An important aspect of the present invention is the first facet 105 at the terminal end 103. The first facet 105 is at an angle about the same as the crystalline plane of the substrate as the result of wet etching. For example, in a silicon substrate, traditional wet etching will result in a V-groove having a wall slope of 54.7° as mentioned above and shown in FIG. 1a. Aside from manufacturability, wet etching also has the ability to handle the complex angles at the terminal end 103 of the groove 102. Applicants have found that the intersection of the grooves with the first facet presents compound angles which are problematic for dry etching. Thus, the compound angles at the junction of the first facet and the grooves cannot be readily etched using dry etching techniques. Wet etching avoids this problem because the crystalline plane dictates the angle.

In one embodiment, the first facet is formed by etching a groove across multiple grooves 102 at the terminal end 103. By etching a common groove across the grooves 102 to define the first facet 105 in one step, economies of scale are realized and continuity among the different first facets is essentially guaranteed. In one embodiment, the first facet is defined in the substrate prior to the substrate being diced from the wafer in which they are formed. In such an embodiment, the groove is etched across not only the grooves of an interposer, but also the grooves of different interposers of a wafer in one process step, further realizing economies of scale and reducing the cost and consistency of producing first facets in the substrates.

Not only does the etching of a common first facet allow for large-scale production, but also, in one embodiment, the interposer of the present invention has other features that lend itself to economical and highly repeatable manufacturing. In particular, most if not all of the critical alignment relationships may be defined on the wafer scale, often in just a few, or even a single, photolithography step. Specifically, the location of the grooves for holding the fiber and the contact pads for electrically connecting and providing passive alignment of the optical devices may be defined in a single masking step. Additionally, in one embodiment, the optical/electrical interconnections among the various components may be defined in a single masking step. For example, the various traces interconnecting the pads for the optical device and the pads for the electrical driver circuitry, and the traces between the driver circuitry and the through substrate vias may be defined in a single masking step. In one embodiment, even the edges of the interposers are defined in the same masking step. In other words, each edge of the interposer is one half of a groove etched in the wafer. The wafer is simply parted at the bottom of each groove to form edges. This way, the distance from the edge of the interposer to critical features such as the grooves 102 may be precisely controlled, often in a single step, thereby eliminating tolerance build up and simplifying assembly manufacturing with the interposer.

Referring to FIG. 1, a cross sectional view of a terminal end 103 of a groove 102 is shown. In this embodiment, a step 120 is formed just below the first facet 105. Such a step may be formed in different ways, although it is readily formed by etching the first facet such that its lower edge 121 is below the optical axis 111, but above the bottom 122 of the groove 102 as shown. This step 120 may be used as a stop for the fiber 110a to enhance its axially positioning/alignment in the groove 102 as described below.

At least a portion of the first facet is treated to make it reflective. In the embodiment in which a first facet 105 traverses across multiple grooves, only the portion along the optical axis 111 of the optical conduit needs to be treated to be reflective. However, in some embodiments, it may be easier or cost effective to treat the entire first facet 105 to make it reflective. In one embodiment, treating the surface involves coating it with a metal or other reflective material as is known in the art. Suitable reflective materials include, for example, gold, silver, aluminum and dielectrics. The materials may be deposited on the facets using known techniques, including, evaporation, sputtering and vapor deposition.

The optical conduit 110 may be any known medium for transmitting light. Although an optical fiber 110a is shown in the embodiment of FIG. 1, it should be understood that any optical conduit may be used. Suitable optical conduits include, for example, discrete fibers, ribbon fibers, and planar waveguides. The use of such planar waveguides is known and is described for example in U.S. patent application Ser. No. 13/017,668 (hereby incorporated by reference.)

As mentioned above, referring to FIG. 1a, an important aspect of the present invention is a waveguide having an end face 112 that has an angle β which is calculated to create an angle of refraction at the end face 112 which is sufficient to compensate for delta between angle α and a 45° at the first facet 105. More specifically, the angle of refraction is such that the combination of the end face and the first facet bend the light beam 170 at 90° between the optical axis 111 and optical axis 131 as shown in FIG. 1. Given the crystalline plane of the substrate (and thus angle α) and the refractive indices at the end face 112, angle β may be readily calculated. For example, if angle α is 54.7°, the optical conduit 110 is a fiber 110a, and gap 160 is air, then angle β is about 123.1°. It should be appreciated if gap 160 is filled or if a waveguide with a different refractive index is used, this angle will change.

Figure 2:
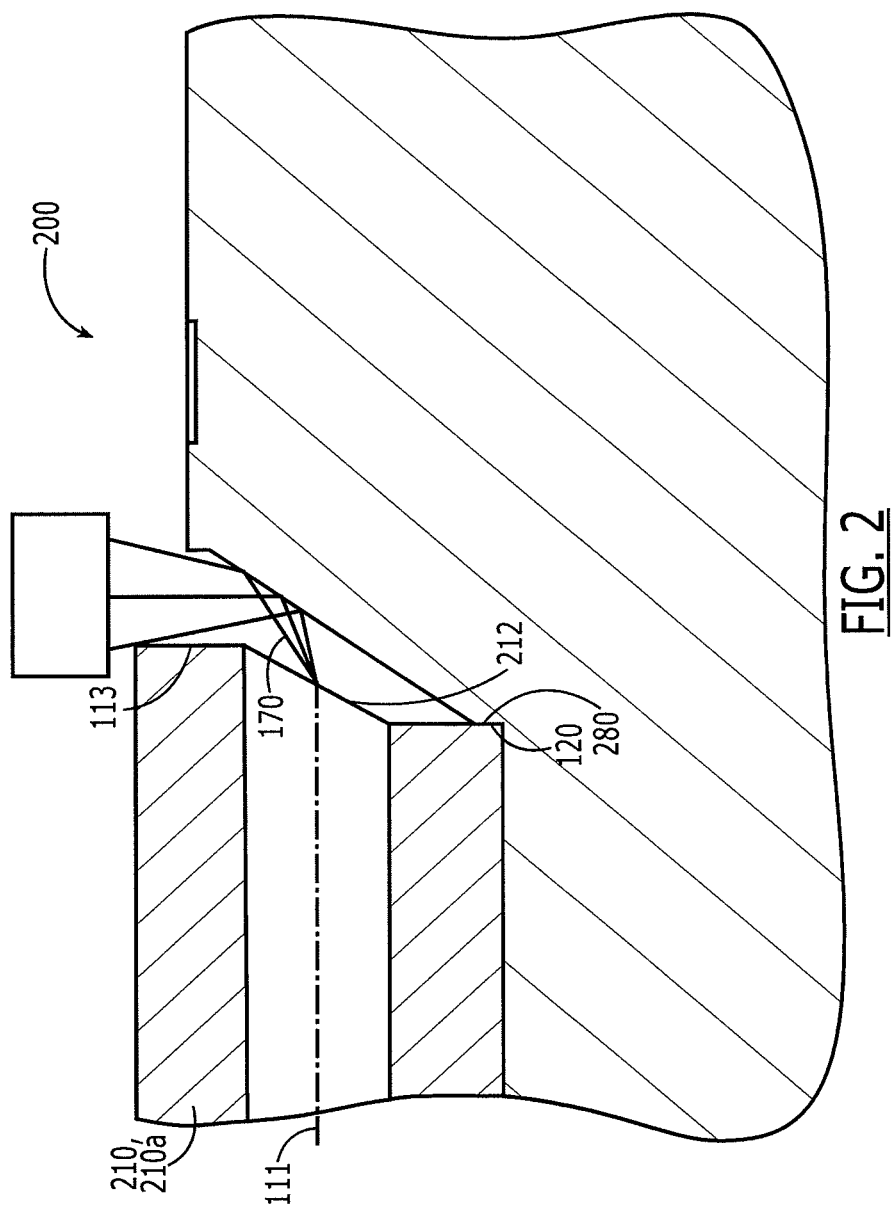
FIG. 2 shows a cross section of a portion of another embodiment of an interposer of the present invention having a perpendicular facet on the optical conduit end face.
Figure 3:
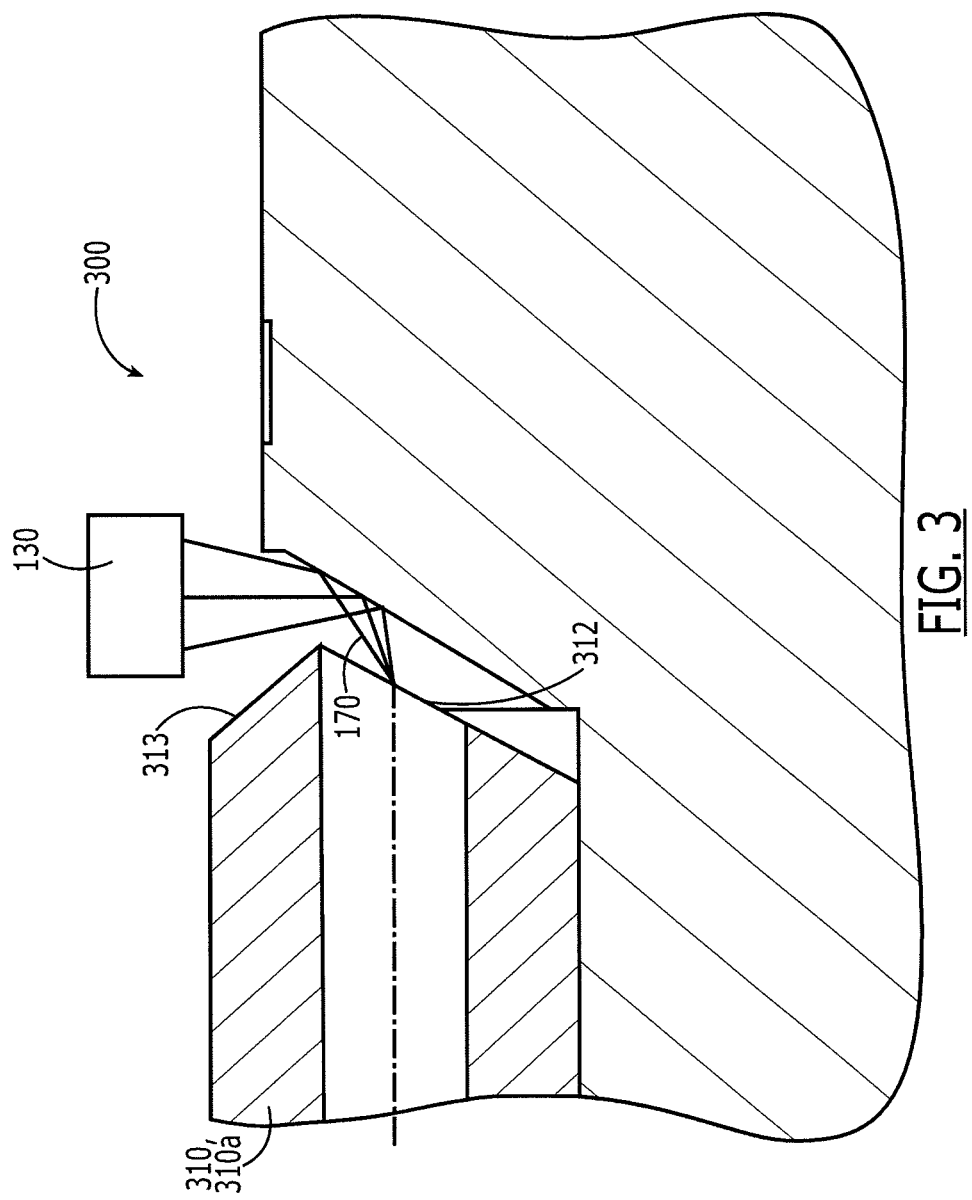
FIG. 3 shows a cross section of a portion of yet another embodiment of an interposer of the present invention having tapered facet on the optical conduit end face to avoid the light beam to/from the optical device.

In addition to the end face having angle β, it may be desirable in certain applications to further profile the end face 112 of the fiber 110 for additional optical performance and/or passive alignment. For example, side facets may be added to the fiber end face on either side of the first mating facet to enhance optical coupling (see, for example, U.S. application Ser. No. 12/510,954). Additionally, as shown in FIG. 2, it may be desirable to have a subassembly 200 in which the end face 212 has a perpendicular face 280 to facilitate positioning of the waveguide 210 in the groove 102 as shown in FIG. 2. That is, the fiber 210a is disposed in the groove 102 such that the perpendicular face 280 abuts the step 120 to axially align the fiber in the interposer. Furthermore, referring back to FIG. 1, it may be desirable to shape the end face 112 with an upper face 113 that is angled to avoid interfering with the beam 170 and optical device 130. As shown in FIG. 1, the upper face 113 is essentially perpendicular to the axis 111 to avoid the beam 170. In one embodiment as shown in FIG. 3, a subassembly 300 comprises an optical conduit 310 (e.g., optical fiber 310a) having an end face 312 with an upper face 313 that is tapered away from the optical device 130 to ensure it does not interfere with the beam 170. In the embodiment of FIG. 3, the upper face 313 is angled at greater than 90° and, in this particular embodiment, about 120°, although the angle of upper face 313 can vary depending on the degree of dispersion/focus of the beam.

The fiber 110a may be secured to the groove in a variety of known ways. For example, the fiber may be metalized and soldered in place or it may be glued in place. In one embodiment, a UV-cured, optically transparent adhesive is used to secure the fiber in the groove.

The optical device 130 may be any known component that is optically coupled to a fiber. The optical device may be for example (a) a passive component, which does not convert optical energy to another form and which does not change state (e.g., fiber, lens, add/drop filters, arrayed waveguide gratings (AWGs), GRIN lens, splitters/couplers, planar waveguides, or attenuators); (b) an OED which converts between optical energy and electrical energy (e.g., lasers, such as vertical cavity surface emitting laser (VCSEL), double channel, planar buried heterostructure (DC-PBH), buried crescent (BC), distributed feedback (DFB), distributed bragg reflector (DBR); light-emitting diodes (LEDs), such as surface emitting LED (SLED), edge emitting LED (ELED), super luminescent diode (SLD); and photodiodes, such as P Intrinsic N (PIN) and avalanche photodiode (APD)); or (c) a hybrid device which does not convert optical energy to another form but which changes state in response to a control signal (e.g., switches, modulators, attenuators, and tunable filters). It should also be understood that the optical device may be a single discrete device or it may be assembled or integrated as an array of devices. In one embodiment, the optical device is an OED 130a.

The optical device 130 has at least one optical axis 131 along which the light propagates to/from the optical device. Because the optical device is disposed over the optical conduit and optically coupled thereto by virtue of the reflective first facet defined in the interposer, generally, although not necessarily, the optical axis is essentially perpendicular to the planar surface. It should be understood that the optical device is not limited to a single optical axis.

The subassembly 100 may also have circuitry (electrical/optical) for providing the necessary interconnections for supporting the optical device 130. For example, referring to FIG. 1, the interposer 150 comprises solder pads 140 for electrically connecting an OED 130a. (It should be understood that FIG. 1 is a schematic and, as such, depicts the OED 130a as floating above the reflective surface 150 without interconnections to the pads 140. This is done for simplicity and to show more clearly the 90° light bending.

The interposer of the present invention also comprises features for passively aligning the fiber and the optical device. One of the primary technical challenges associated with the manufacture of optical assemblies, especially systems offering higher levels of integration, is component optical alignment. This is especially applicable in free-space, interconnect optical systems where discrete optical devices, such as active devices (e.g., semiconductor lasers), passive devices (e.g., filters), and/or MOEMS (micro-optical electromechanical systems) (e.g., tunable filters and switches) are integrated on a common mounting system to exacting tolerances, typically in the sub-ten micrometer down to sub-micrometer range.

There are generally two alignment approaches for aligning optical devices—active and passive. In passive alignment, registration or alignment features are typically fabricated directly on the components as well as on the platform to which the components are to be mounted. The components are then positioned on the platform using the alignment features and affixed in place. In active alignment, the optical devices are placed on the platform, but before being affixed thereto, an optical signal is transmitted through the components while they are manipulated to provide optimum optical performance. Once optimum performance is achieved, the components are affixed to the platform. Although active alignment tends to be more precise than passive alignment, passive alignment facilitates high-speed, high-volume automated manufacturing and, thus, is preferred. It tends to be exceedingly difficult, however, to optically align in all three axes using passive alignment, especially if exceptionally good alignment is required. Nevertheless, a significant reduction in manufacturing time and costs can be realized if passive alignment can be used to achieve acceptable alignment along two axes or even one so that active alignment is only necessary for the remaining axes or for fine tuning.

The interposer of the present invention may have a number of features to facilitate passive alignment of the fiber and/or optical device. For example, as already mentioned above, to facilitate passive alignment of the fiber in the interposer, in one embodiment, the terminal end 103 defines a step 120 to axially align the optical fiber in the groove 102. In one embodiment, the interposer also has fiducials to facilitate passive alignment of the optical device 130 such that each of its optical axes is aligned with its respective optical path. Fiducials may be any structure or marking which provides for the passive alignment of the optical device. A variety of fiducials may be used. In one embodiment, a pattern of contact pads are used that passively align the optical device during a reflow operation. Specifically, the optical device is provided with a certain pattern of contact pads on its bottom, the interposer has the same pattern on its top planar surface. The optical device is then placed on the pads in rough alignment using known pick and place technology. Alignment between the interposer and optical device is then achieved when the assembly is reflowed such that the surface tension of the contact pads causes the patterns of the optical device to align over the pattern on the interposer, thereby precisely positioning the optical device relative to the grooves of the interposer. Such a mechanism is well known and disclosed for example in U.S. Pat. No. 7,511,258, incorporated herein by reference.

In another embodiment, rather than or in addition to contact pads, other fiducials on the interposer are used to facilitate passive alignment. For example, the fiducials may be physical structures protruding from the planar surface that provide a register surface against which the edge of the optical device may contact to be positioned correctly on the interposer. Alternatively, the fiducials may be markings to enable visual alignment of the optical device on the interposer using a commercially-available, ultra-high precision die bonding machine, such as, for example, a Suss MicroTec machine (See, e.g., U.S. Pat. No. 7,511,258).

Additionally, a combination of fiducials and contact pads may be used. For example, the pads may be used to pull the optical device into contact with the raised fiducials of the interposer. Still other alignment techniques will be apparent to one of skill in the art in light of this disclosure.

Therefore, the interposer of the present invention may have one or more features for optically coupling an optical device to a fiber, features for providing passive alignment of the fiber and/or optical device, and electrical/optical interconnections for interconnecting the optical device with required circuitry and for interfacing the interposer with the higher level flex circuit or printed circuit board.

The etching may also be performed on wafer-scale. In one embodiment, the grooves, and the edges of the interposer are all defined and etched at the wafer-scale. Further economies may be realized by etching these features using the same photolithographic procedure. Although a single etching procedure may be used, in certain circumstances, two or more etching procedures may be beneficial.

It should be apparent from the above description that the interposer assembly of the present invention provides for significant advantages over conventional interposer configurations such as lower cost and simplicity in manufacturing and enhanced versatility with respect to the type of mating components with which it can effect optically coupling. Still other advantages of the interposer assembly are anticipated.

What is claimed is:

1. An optical interposer comprising:
a crystalline substrate having a top planar surface and a crystalline plane angle;
a plurality of grooves defined in said top planar surface and extending from an edge of said substrate to a terminal end, each of said plurality of grooves having side walls and a first facet at said terminal end perpendicular to said side walls, said first facet having a first angle relative to said top planar surface, said first angle being about said crystalline plane angle, said first facet running across each of said plurality of grooves, said first angle having a delta from a 45° angle, wherein said substrate is silicon and said first angle is 54.7°;
a reflective coating on said first facet;
an optical conduit having an optical axis and an end face having a second angle with respect to said optical axis, said second angle being non-perpendicular to said optical axis such that the angle of refraction at said end face compensates for said delta such that said end face and said first facet cooperate to bend light about 90°; wherein said end face and said first facet define a space therebetween, wherein said space is an air gap and said second angle is 123.1°.

2. An optical interposer comprising:
a crystalline substrate having a top planar surface and a crystalline plane angle;
at least one groove defined in said top planar surface and extending from an edge of said substrate to a terminal end, said groove having side walls and a first facet at said terminal end perpendicular to said side walls, said first facet having a first angle relative to said top planar surface, said first angle being said crystalline plane angle, said first angle having a delta from a 45° angle;
a reflective coating on said first facet; an optical conduit having an optical axis and an end face having a second angle with respect to said optical axis, said second angle being non-perpendicular to said optical axis such that the angle of refraction at said end face compensates for said delta such that said end face and said first facet cooperate to bend light 90°, wherein said end face is shaped with multiple faces at different angles to said optical axis, a first face being at said second angle and disposed along said optical axis, a second face having a third angle greater than said second angle and being disposed above said first face.

3. The optical interposer of claim 2, wherein said substrate is silicon and said first angle is 54.7°.

4. The optical interposer of claim 3, wherein said first facet is produced by wet etching said substrate.

5. The optical interposer of claim 4, wherein said optical conduit is an optical fiber.

6. The optical interposer of claim 3, wherein said end face and said first facet define a space therebetween, wherein said space is an air gap and said second angle is 123.1°.

7. The optical interposer of claim 2, wherein said third angle is greater than 90° to said optical axis.

8. A subassembly comprising:
- a crystalline substrate having a top planar surface and a crystalline plane angle;
- at least one groove defined in said top planar surface and extending from an edge of said substrate to a terminal end, said groove having side walls and a first facet at said terminal end perpendicular to said side walls, said first facet having a first angle relative to said top planar surface, said first angle being said crystalline plane angle, said first angle having a delta from a 45° angle;
- a reflective coating on said first facet; an optical conduit having a first optical axis and an end face having a second angle with respect to said first optical axis, said second angle being non-perpendicular such that the angle of refraction at said end face compensates for said delta such that said end face and said first facet cooperate to bend light at 90°; and
- an optical device having a second optical axis perpendicular to said top planar surface, said optic device being disposed on said top planar surface at said terminal end such that said second optical axis is disposed over said first facet such that said optical device is optically coupled with said optical conduit; wherein said end face is shaped with multiple faces at different angles to said optical axis, a first face being at said second angle and disposed along said optical axis, a second face having a third angle greater than said second angle and being disposed above said first face.

9. The subassembly of claim 8, wherein said substrate is silicon and said first angle is 54.7°.

10. The subassembly of claim 9, wherein said first facet is produced by wet etching said substrate.

11. The subassembly of claim 10, wherein said optical conduit is an optical fiber.

12. The subassembly of claim 11, wherein said end face and said first facet define a space therebetween, wherein said space is an air gap and said second angle is 123.1°.

13. The subassembly of claim 8, wherein said third angle is greater than 90° to said optical axis.

14. The subassembly of claim 8, wherein said at least one groove comprises a plurality of grooves and said first facet runs across each of said plurality of grooves.

* * * * *